Figure 2:
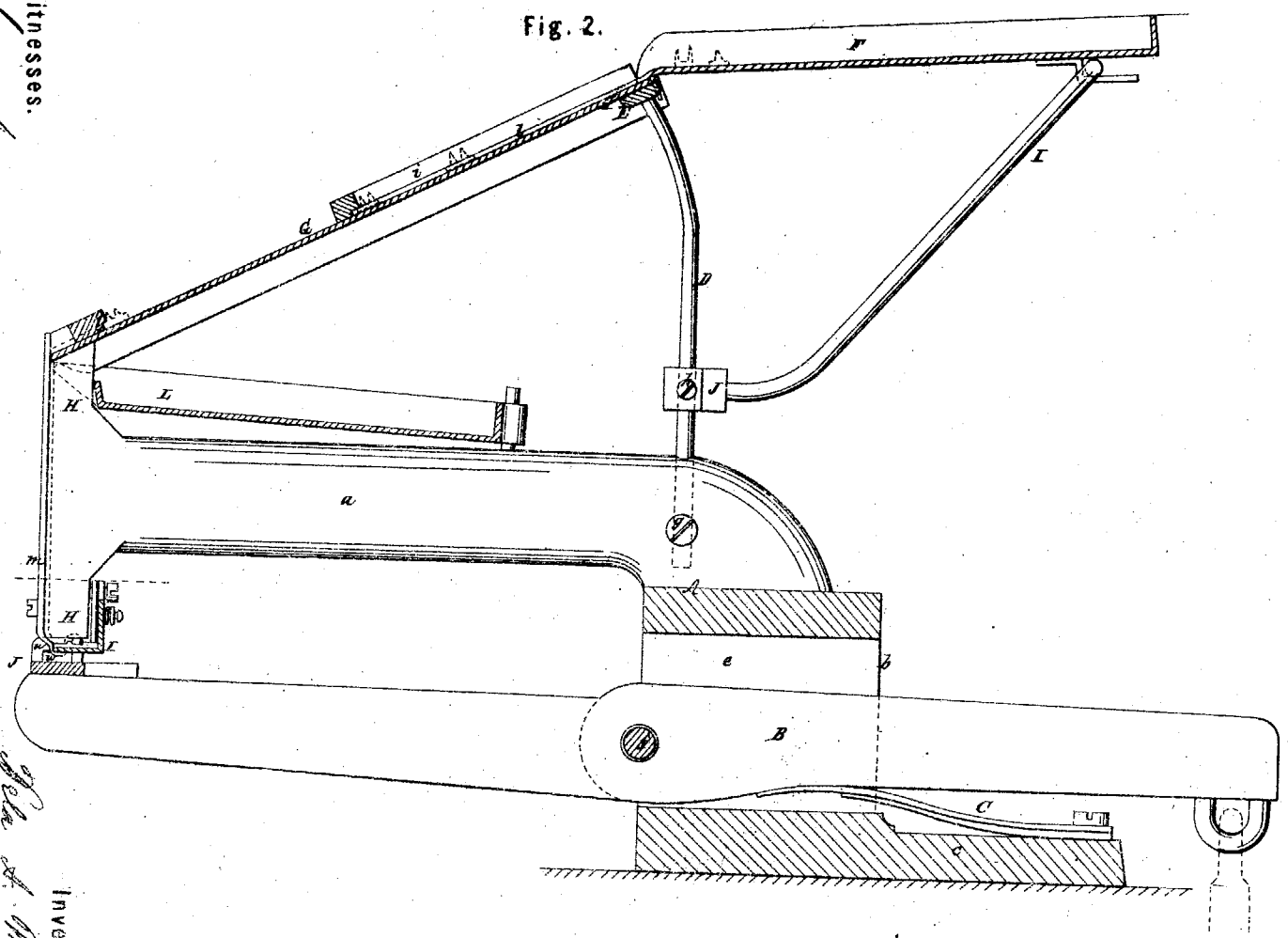

B. A. Mann's
Hoop Skirt Mach.
No. 1,518.
Reissued Aug 4. 1863.
Fig. 1.
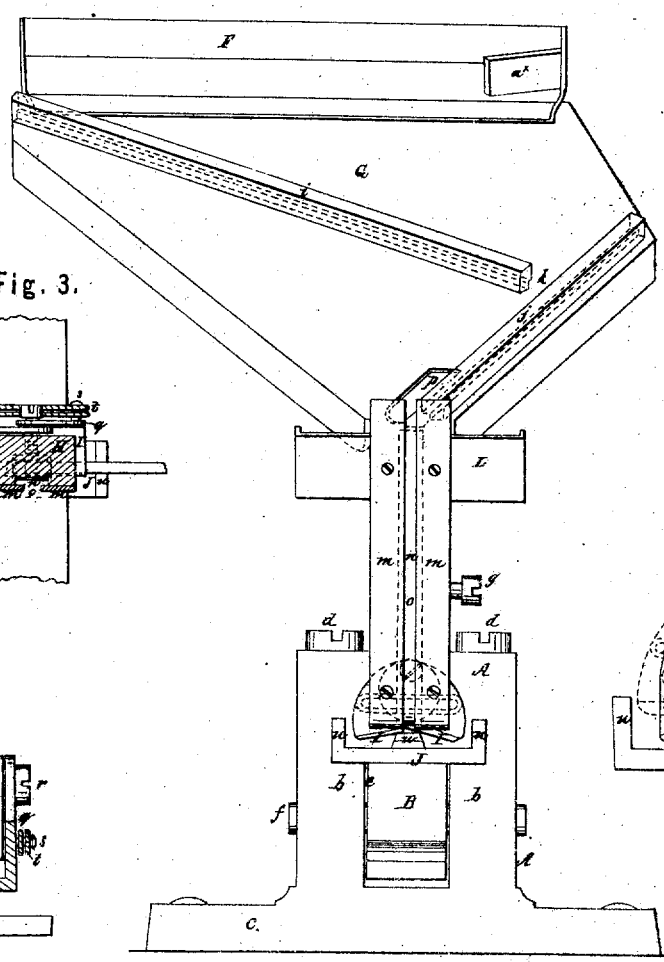
Fig. 3.
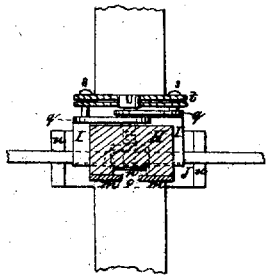
Fig. 4.
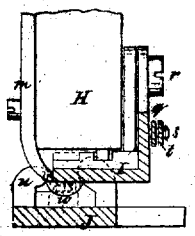
Fig. 5.
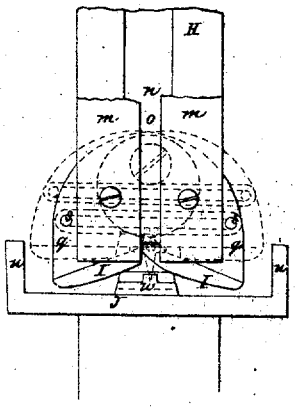
Fig. 6.
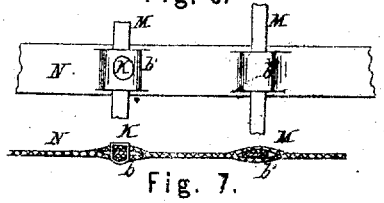
Fig. 7.
Fig. 8.
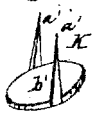
Witnesses.
Andrus Anderson Jr
W. L. Bennett
Inventor.
Bela A. Mann
by his Attorney
E. S. Renwick Sheet 2.
2 Sheets.

B. A. Manns
Hoop Skirt Mach.

No. 1518.

Reissued Aug. 4. 1863.

Witnesses.
Andrew Anderson Jr
W. C. Bennett

Inventor.
Bela A. Mann
by his Attorney
E. S. Renwick

UNITED STATES PATENT OFFICE.

BELA A. MANN, OF MERIDEN, CONNECTICUT, ASSIGNOR, BY MESNE ASSIGNMENTS, TO JEDEDIAH WILCOX.

IMPROVEMENT IN MACHINES FOR CLASPING HOOPS TO LADIES' SKIRTS.

Specification forming part of Letters Patent No. 34,026, dated December 24, 1861; Reissue No. 1,518, dated August 4, 1863.

*To all whom it may concern:*

Be it known that I, BELA A. MANN, of West Meriden, in the county of New Haven and State of Connecticut, have invented a new and useful Machine for Clasping Hoops to Ladies' Skirts; and I do hereby declare that the following is a full, clear, and exact description of the same, reference being had to the accompanying drawings, in which—

Figure 1 represents a front view of a self-feeding machine embodying all the parts of my invention. Fig. 2 represents a vertical longitudinal section of the same at the line *x x* of Fig. 1. Fig. 3 represents a horizontal section of the same at the line *y y* of Fig. 2. Fig. 4 represents a section of a portion of the machine on an enlarged scale. Fig. 5 represents a front view of a portion of the machine on an enlarged scale. Fig. 6 represents a fragment of a hoop-skirt, showing the work performed by the machine. Fig. 7 represents a section of the skirt at the line *z z* of Fig. 6, and Fig. 8 represents a view in perspective of a skirt-clasp upon an enlarged scale.

Previous to my invention the hoops of ladies' hoop-skirts have been secured to the tapes by means of clasps, whose tongues are inserted through the tapes and clinched over the hoops.

The operation of applying the clasps and clinching has been performed by hand, and in some cases pliers operated by the hand have been used to effect the clinching by pressure.

The object of my invention is to enable the skirt-clasp to be applied to the skirts and clinched with greater rapidity than has heretofore been practicable, and to dispense with the handling of the clasps, the application of the clasps in proper positions for clinching and their subsequent clinching being effected by machinery.

To this end the first part of my invention consists in a skirt-clasp-feeding device, consisting, substantially, of an inclined plate and one or more guide-bars, or their equivalent, operating in such manner that skirt-clasps which are supplied to the feeding device with their tongues in various positions relatively to the place of supply are delivered by the device with their tongues in the same positions relatively to the place of delivery.

The second part of my invention consists in the construction of a feeding device, operating substantially as above set forth, with an opening to permit the escape of misarranged skirt-clasps.

The third part of my invention consists in the combination of a hopper with a clasp-feeding device and with a clasp-supplying device, or their joint or several equivalents, the combination of these devices as a whole being such that skirt-clasps placed promiscuously in the hopper are received in the clasp-supplying device with their tongues in the same positions relatively thereto and are held therein in a row ready for the performance of a subsequent operation.

The fourth part of my invention consists in the combination of a clasp-clinching device with a clasp-supplying device, the combination being such that skirt-clasps supplied in a row are operated upon in succession by the clinching device.

The fifth part of my invention consists in the combination, in one machine, of a hopper, a clasp-feeding device, a clasp-supplying device, and a clasp-clinching device, or their joint or several equivalents, the combination as a whole operating in such manner that skirt-clasps placed promiscuously in the hopper may be clinched in succession upon articles submitted to the machine.

The sixth part of my invention consists in the combination of a clasp-clinching device with a liberating device which permits the disengagement of the clasp from the clasping-machine.

The seventh part of my machine consists in the combination of a clinching device for clinching clasps and of a device for supplying it with clasps, with a treadle to control the same by the foot, so that in the operation of clinching clasps to skirts the hands of the operator are left at liberty to manipulate the skirt.

Some of the parts of my invention may be used without the others; but I believe that the best result will be obtained by using all the parts in the same machine, and the self-feeding skirt-clasp-clinching machine represented in the accompanying drawings embodies all parts of my invention.

In the drawings, A represents the stock or frame of the machine, which is composed of a horizontal arm, *a*, projecting from a short upright pillar, *b*, on a base-plate, *c*. These parts may be of cast metal, and the pillar *b* and plate *c* may be cast in one piece, while the arm *a* may be cast separate and secured to the top of the pillar *b* by screws *d*. The pillar *b* has a slot or recess, *e*, made in it, through which a lever, B, passes, the fulcrum-pin *f* of the lever passing through lugs or projections at the front part of the pillar.

C is a spring, which is secured to the back part of the base-plate *c*, and acts against the under side of the back part of lever B, and has a tendency to keep the front end of said lever in a downward position, as will be understood by referring to Fig. 2. The back end of the lever B is connected by a rod or chain to a treadle, which may be arranged in the usual way that treadles are arranged for mortising-machines, registering-machines, &c. The base-plate *c* is bolted to a bench or framing of such a height as to admit of the attendant or operator sitting while at work with the machine.

D is a rod, which is fitted vertically in the back part of the arm *a*, and may be secured higher or lower in position by means of a set-screw, *g*. The upper part of the rod D is curved slightly forward, and has a horizontal bar, E, attached to it, which bar forms a support for the front end of a hopper, F, and the back end of a feeding-plate, G. The front end of the feeding-plate rests on the top of an upright head or bar, H, which is at the front end of the arm *a*, and may be cast with it in one piece. The back of the hopper F rests on the upper and horizontal part of the rod I, the lower part of which is inclined and is fitted in a slide, J, on the rod D, said slide being secured on the rod at any desired point by a set-screw, *h*. (See Fig. 2.) By adjusting the slide J higher or lower on the rod D a greater or less inclination may be given the hopper F, and the feeding-plate G may be more or less inclined by adjusting the rod D higher or lower in the arm *a*. This will be fully understood by referring to Fig. 2. The hopper F is simply a shallow sheet-metal box or pan, of rectangular form, open at the front end and having a short vertical plate or ledge, $a^{\times}$, fitted obliquely at its front part and right-hand side, as shown in Fig. 1. The feeding-plate G has a more inclined position than the hopper F, and it may be described as being a plane, with two bars, *i j*, attached nearly or about at right angles with each other. (See Fig. 1.) The bars *i j* are not in contact, a space, *k*, being between them, and each bar has a groove, *l*, made in the lower part of its face side, both of which are shown in Fig. 2.

The feeding-plate and guide-bars constitute the feeding device in the machine represented.

The feeding-plate G has an oblong slot or opening, *p*, made through it at its front part. This slot or opening is quite near the bar *j*, as will be seen by referring to Fig. 1. It permits the escape of misarranged clasps, as will be presently explained, and beneath it there is a box, L, to receive such clasps as pass through the opening. This box is secured to the upper surface of the arm *a*.

Next in order to the feeding device is the clasp-supplying device, in which the clasps from the feeding device are received and held in a row, to be supplied in succession as required in performing a subsequent operation upon them. This clasp-supplying device, in the present machine, is formed by two vertical plates, *m m*, and a groove, *n*, the plates being secured to the front side of the head or bar H with a small or narrow space, *o*, between them, as shown at Fig. 1, to receive and guide the tongues of the clasps. The plates *m m* overlap the edges of the groove *n*, which is made in the face of the head H. (See Fig. 3.) The lower ends of the plates *m m* are curved, so as to project beneath the under part of the head H, as shown in Figs. 2 and 4.

The liberating device is situated at the lower end of the clasp-supplying device. It consists, in the present machine, of two plates or jaws, held together by a spring, which permits them to be opened when a clasp is to be liberated. The two plates I I have each an upright lug, *q*, at their back edges, and these lugs overlap each other, and are secured to the head or bar H by a screw, *r*. The plates I I therefore, it will be seen, are suspended from the screw *r*, the lugs *q q* being allowed to work freely on it. Each lug *q* has a small hook or pin, *s*, attached to it, and around these pins a spring, *t*, passes. This spring may be of india-rubber or other suitable elastic material, and it has a tendency to keep the inner edges of the plates I I in contact, in which position they are somewhat inclined, as shown in Figs. 1 and 5.

The skirt-clasps in the clasp-supplyer are supplied to the clinching device, which in this machine consists, substantially, of two members, between which the clasp is compressed in such manner that the tongues are bent. One of these members is formed by the under side of the head H. The other is formed by a clinching block of steel, *w*, which is secured to the forward end of the lever B, and has a circular groove extending longitudinally in its upper surface, as shown at Fig. 4. Between the block *w* and the lever B there is a steel plate, J, whose ends are turned up and notched to form guides *u u*, in which the skirt-hoop to which the clasp is to be applied is received. The notch is denoted by V in the drawing, Fig. 4.

The clasps K which are used with the machine are of the ordinary construction, with two tongues, *a′ a′*, projecting from a plate, *b′*, as shown in Fig. 8.

The operation of the machine is as follows: The clasps K are placed promiscuously in the hopper F, and gradually pass down upon the feeding-plate G, the jar or vibration of the machine when in operation constituting a sufficient shake motion. The clasps pass down against the bar *i* in an inverted position, and are conducted by said bar to bar *j*. As the clasps pass down the bars, they arrange themselves with their tongues in the same positions with reference to the bars, the plates *b'* of the clasps fitting in the grooves *l* of the bars, so that when the clasps in succession reach the place of delivery their tongues are in the same relative position thereto; but in case any clasp is misarranged—that is, has not arranged itself with the tongues in the proper positions against the bar—it cannot pass by the slot or opening *p*, but is caught by this opening, which is so close to the bar *j* that a misarranged clasp will tip over through the opening and fall into the box L. The lowest bar, *j*, conducts the clasps to the passage-way of the clasp-supplying device, formed by the plates *m m* and groove *n*, and this passage-way may be filled with clasps, the prongs *a'* of which project through the space *o*, the clasps thus being held in a row. The lowermost clasp of the row has an upright position, with its tongues pointing down, as the lower curved ends of the plates *m m* conduct it between the plates I I, which retain it in such position under the head H and directly over the clinching-block *w*, one of the plates I being notched at its inner edge to receive the clasp. The operator places the hoop M on the plate J, the loop *b'* of the tape N being in the clinching-block *w*. Then the back end of the lever B is drawn suddenly down by the action of the foot of the operator on the treadle, and the front end of the lever B is forced upward, and the prongs *a' a'* of the clasps will be forced through the edges or sides of the loop *b'* and through the tape N, and, coming in contact with the concave or semicircular grooved surface of the clinching-block *w*, will be bent in and clinched at the under side of the tape N, as shown by the dotted lines in Fig. 4. After each clasp is clinched the hoop M is moved along on the plate J, and is secured to every tape of the skirt in the way described, the clasps K feeding themselves down in the passage-way behind the plates *m m* of the clasp-supplying device by their own gravity. As each clasp K is clinched, the plates I I are forced upward and apart by the action of the clinching-block *w*, (see dotted lines in Fig. 5,) so as to liberate the clinched clasp, the plates I I instantly closing under the action of the spring *t* as the plate J and clinching-block *w* descend.

Having thus described my invention and a machine embodying all of its parts, what I claim as new, and desire to secure by Letters Patent, is—

1. A clasp-feeding device consisting, substantially, of an inclined plate and one or more guide-bars, the whole operating substantially as herein set forth.

2. The said feeding device, constructed with an opening to permit the escape of misarranged clasps, substantially as herein set forth.

3. The combination of a hopper with a clasp-feeding device and with a clasp-supplying device, the combination, as a whole, operating substantially as herein set forth.

4. The combination of a clasp-clinching device with a clasp-supplying device, the whole operating substantially as herein set forth.

5. The combination of a hopper, a clasp-feeding device, a clasp-supplying device, and a clasp-clinching device, the combination, as a whole, operating substantially as herein set forth.

6. The combination of a clasp-clinching device with a liberating device, operating substantially as herein set forth.

7. The combination of a clasp-clinching device and of a clasp-supplying device with a treadle, operating substantially as herein set forth.

In testimony whereof I have hereunto subscribed my name.

BELA A. MANN.

Witnesses:
WARD COE,
J. N. LEAVENWORTH.